United States Patent
Chang

(10) Patent No.: US 8,774,505 B2
(45) Date of Patent: Jul. 8, 2014

(54) METHOD AND APPARATUS OF FIXED BIT-RATE IMAGE COMPRESSION/DECOMPRESSION BASED ON 2×2 IMAGE UNIT

(75) Inventor: Chih Kai Chang, Taichung (TW)

(73) Assignee: Orise Technology Co., Ltd., Hsinchu Science Park (TW)

(*) Notice: Subject to any disclaimer, the term of this patent is extended or adjusted under 35 U.S.C. 154(b) by 161 days.

(21) Appl. No.: 13/604,879

(22) Filed: Sep. 6, 2012

(65) Prior Publication Data
US 2013/0071021 A1    Mar. 21, 2013

(30) Foreign Application Priority Data
Sep. 15, 2011   (TW) .............................. 100133161 A

(51) Int. Cl.
G06K 9/36      (2006.01)
(52) U.S. Cl.
USPC ......................................................... 382/166
(58) Field of Classification Search
None
See application file for complete search history.

(56) References Cited

U.S. PATENT DOCUMENTS

| | | | |
|---|---|---|---|
| 8,351,692 B2* | 1/2013 | Lee et al. ....................... | 382/166 |
| 2003/0138151 A1* | 7/2003 | Schwartz ....................... | 382/239 |
| 2003/0138157 A1* | 7/2003 | Schwartz ....................... | 382/240 |
| 2008/0175489 A1* | 7/2008 | Lee et al. ....................... | 382/232 |
| 2009/0016624 A1* | 1/2009 | Sung et al. ..................... | 382/238 |

* cited by examiner

*Primary Examiner* — Bhavesh Mehta
*Assistant Examiner* — Feng Niu
(74) *Attorney, Agent, or Firm* — Bacon & Thomas, PLLC

(57) ABSTRACT

A method of fixed bit-rate image compression/decompression based on 2×2 image unit encodes an image that is divided into a plurality of 2×2 coding units. The method determines whether a 2×2 coding unit has one of first to seven man-made patterns. When the 2×2 coding unit has one of the first to seven man-made patterns, a differential error encoding and a quantization and look-up are performed on the 2×2 coding unit for generating a first coded data. Otherwise, the 2×2 coding unit is a natural pattern, and the method sequentially performs a color domain transform, a discrete cosine transform, and a quantization and look-up on the 2×2 coding unit for generating a second coded data.

29 Claims, 9 Drawing Sheets

METHOD AND APPARATUS OF FIXED BIT-RATE IMAGE COMPRESSION/DECOMPRESSION BASED ON 2×2 IMAGE UNIT

CROSS REFERENCE TO RELATED APPLICATION

This application claims the benefits of the Taiwan Patent Application Serial Number 100133161, filed on Sep. 15, 2011, the subject matter of which is incorporated herein by reference.

BACKGROUND OF THE INVENTION

1. Field of the Invention

The present invention relates to the technical field of image compression/decompression and, more particularly, to a method and apparatus of fixed bit-rate image compression/decompression based on 2×2 image unit.

2. Description of Related Art

Typically, the lossless image compression can be divided into, for example, run length coding, Huffman coding, Lempel-Ziv-Weich coding, arithmetic coding, differential coding, and lossless JPEG coding. The run length coding uses two bytes to indicate a series of data with the same value, wherein the first byte indicates the length of the series of data and the second byte records the value of the data. For example, the run length coding is performed on data "555555AA" to generate "652A" for indicating that there are six "5s" and two "As", and in this case four bytes are saved. However, the run length coding has to calculate the repetition data rate, and when the data has a low repetition rate, the compression rate becomes low. The Huffman coding is based on the presence probability to perform a binary tree coding on input data. The symbols of the input data with a high presence probability are given with a short code, and the symbols with a low presence probability are given with a long code. Thus, the amount of data used in average can be reduced. However, similar to the run length coding, the Huffman coding has to calculate the presence probability of the input data.

The Lempel-Ziv-Weich coding uses a present string as an index to compare with a lookup table, and establishes an indexing scheme as a data compression stream. However, the Lempel-Ziv-Weich coding has to use a large memory space for temporarily storing the established tables.

The arithmetic coding is characterized in using a real number to represent a compressed string, instead of using a symbol to represent one bit. Such a way needs to first read an original string once in order to calculate the presence probability of each different codeword, divide a range of real numbers from zero to one into a table of original coding intervals, sequentially read the characters of the original string, and further divide the original coding interval occupied by each read character based on the table of original coding intervals until the last character is read and a last interval is obtained. A real number of the last interval is selected to represent the compressed file of the original string. The code obtained by the arithmetic coding requires only a space for storing one floating number, but not a large of storage space as cited in the Huffman coding. However, the arithmetic coding has the disadvantage of very complicated computation required for the presence probability and algorithm of the input data.

The differential coding is based on a difference between an estimate and an actual value for compression, but has a low bit rate as it is used alone. The lossless JPEG coding is based on a discrete cosine transform and predicted error values.

In the aforementioned image compressions, the bit rates are not fixed and thus more computation resources are required in decompression for accurately obtaining the data length. In addition, an embedded system or a handheld device has limited computation capability and memory capacity. Therefore, the cited image compressions are not satisfactory for the embedded system or the handheld device. Accordingly, it is desirable to provide an improved image compression and decompression for an embedded system or a handheld device to mitigate and/or obviate the aforementioned problems.

SUMMARY OF THE INVENTION

The object of the present invention is to provide a method and apparatus of fixed bit-rate image compression/decompression based on 2×2 image unit, which can generate a fixed bit rate image so as to reduce the required hardware and maintain the image quality.

According to a feature of the invention, there is provided a method of fixed bit-rate image compression/decompression based on 2×2 image unit, which encodes one of a plurality of 2×2 coding units of an image. The method comprises the steps of: (A) receiving a 2×2 coding unit which contains an upper left pixel, an upper right pixel, a lower left pixel, and a lower right pixel in a matrix arrangement; (B) determining whether the 2×2 coding unit is a man-made pattern and, if yes, the 2×2 coding unit being determined to be the man-made pattern, otherwise the 2×2 coding unit being determined to be a natural pattern, wherein the man-made pattern includes a first man-made pattern which indicates that the four pixels present two strips in a horizontal direction, a second man-made pattern which indicates that the four pixels present two strips in a vertical direction, a third man-made pattern which indicates that the four pixels present two strips crossed at 45 degree direction, and fourth to seventh man-made patterns which indicate that the four pixels present a combination of triangle and single point; (C) performing a differential error encoding and a quantization and lookup on the 2×2 coding unit of man-made pattern for generating a first coded data; (D) performing a color domain transform on the 2×2 coding unit of natural pattern for generating a 2×2 color domain transform unit; (E) performing a discrete cosine transform on the 2×2 color domain transform unit for generating a 2×2 frequency domain unit; and (F) performing a quantization and lookup on the 2×2 frequency domain unit for generating a second coded data.

According to another feature of the invention, there is provided a method of fixed bit-rate image decompression based on 2×2 image unit, which decodes a coded packet for generating one of a plurality of 2×2 decoding units of an image, each 2×2 decoding unit containing four pixels in a matrix arrangement. The method comprising the steps of: (A) receiving a coded packet; (B) using a first header of the coded packet to determine whether the coded packet is a man-made pattern and, if yes, the coded packet being determined to be a man-made pattern, otherwise to be a natural pattern; (C) performing an inverse quantization and inverse lookup and an inverse differential error decoding on the coded packet of the man-made pattern for generating a first decoded data; (D) performing an inverse quantization and lookup on the coded packet of natural pattern for generating a second decoded data; (E) performing a inverse discrete cosine transform on the second decoded data for generating a third decoded data; (F) performing a color domain transform on the third decoded data for generating a fourth decoded data; and (G) receiving and reconstructing the first or fourth decoded data for generating the 2×2 decoding unit.

According to a further feature of the invention, there is provided a display system of fixed bit-rate image compression/decompression for performing a compression and decompression operation on an image. The display system includes: a display module for displaying the image; an image input device for inputting the image; a fixed-bit-rate image compression device connected to the image input device for encoding the 2×2 coding unit of the image to generate the coded packet corresponding to the 2×2 coding unit; a buffer connected to the fixed-bit-rate image compression device for temporarily storing the coded packet outputted by the fixed-bit-rate image compression device; a fixed-bit-rate image decompression device connected to the buffer for receiving and decompressing the coded packet to generate the 2×2 decoding unit corresponding to the 2×2 coding unit; and a timing controller connected to the fixed-bit-rate image decompression device for receiving the 2×2 decoding unit to generate the clock driving signal and display data of the display module, wherein the fixed-bit-rate image compression device first determines whether the 2×2 coding unit is a man-made or natural pattern, next performs a differential error encoding and a quantization and look-up on the 2×2 coding unit for generating the first coded data when the 2×2 coding unit is a man-made pattern, then sequentially performs a color domain transform, a discrete cosine transform, and a quantization and look-up on the 2×2 coding unit for generating a second coded data when the 2×2 coding unit is a natural pattern, and finally packages the first or second coded data for generating the coded packet with a fixed bit rate.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
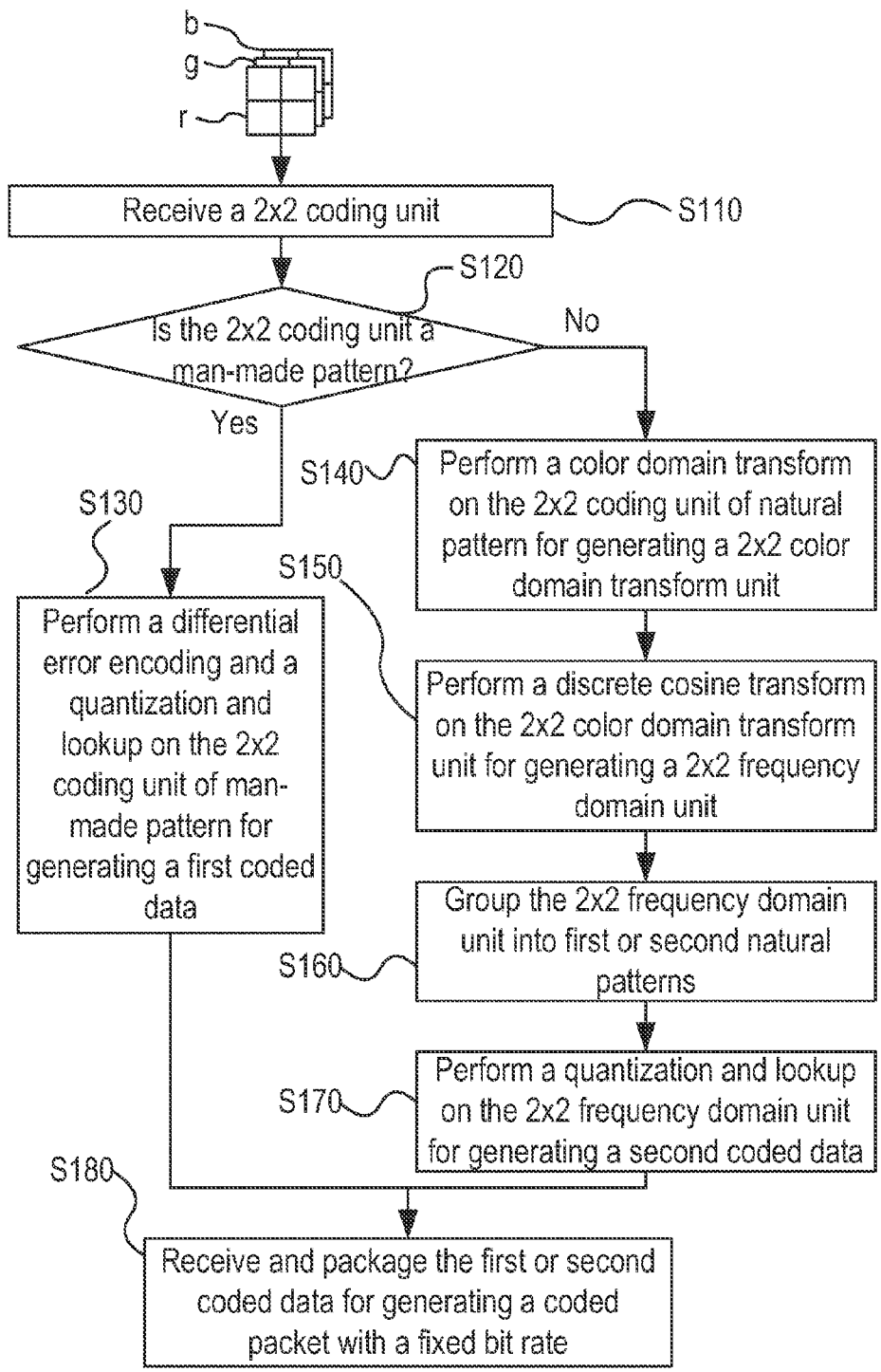
FIG. 1 is a flowchart of a method of fixed bit-rate image compression based on 2×2 image unit according to an embodiment of the invention.

FIG. 1 is a flowchart of a method of fixed bit-rate image compression based on 2×2 image unit according to an embodiment of the invention. In FIG. 1, the method encodes a 2×2 coding unit of an image.

At first, in step S110, the method receives the 2×2 coding unit which includes an upper left pixel, an upper right pixel, a lower left pixel, and a lower right pixel in a matrix arrangement.

Figure 2:
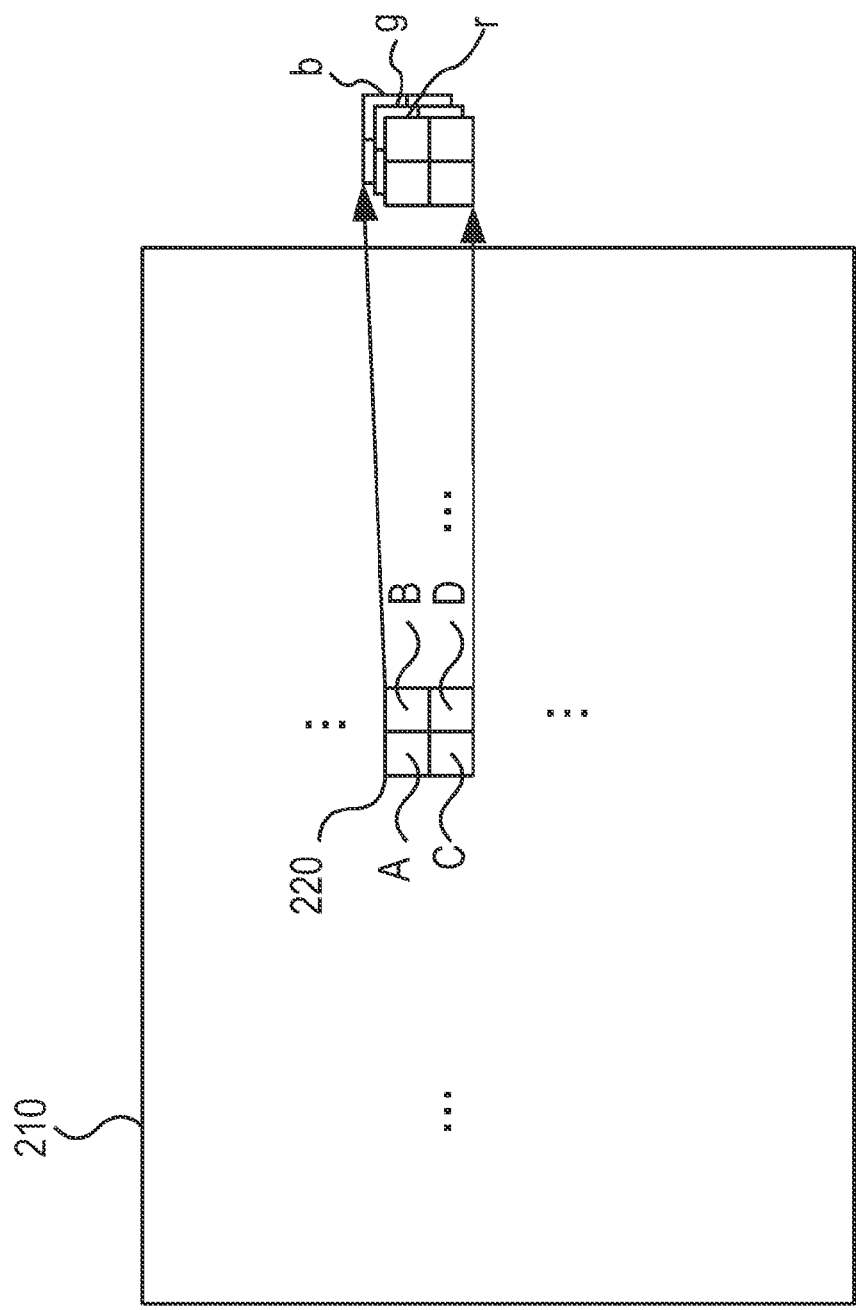
FIG. 2 is a schematic diagram of an image and 2×2 coding unit according to an embodiment of the invention.

FIG. 2 is a schematic diagram of the image 210 and the 2×2 coding unit according to an embodiment of the invention. As shown in FIG. 2, the image 210 has a plurality of 2×2 coding units 220, each having four pixels A, B, C, and D, where A indicates the upper left pixel, B indicates the upper right pixel, C indicates the lower left pixel, and D indicates the lower right pixel. Each pixel has three primary colors, i.e., red (r), blue (g), green (g), wherein $A_r$, $A_g$, and $A_b$ represent red, green, and blue values of the pixel A, respectively; $B_r$, $B_g$, and $B_b$ represent red, green, and blue values of the pixel B, respectively; $C_r$, $C_g$, and $C_b$ represent red, green, and blue values of the pixel C, respectively; $D_r$, $D_g$, $D_b$ represent red, green, and blue values of the pixel C, respectively. Each value is expressed by eight bits, and thus the 2×2 coding unit 220 requires 96 (=4×3×8) bits.

Step S120 determines whether the 2×2 coding unit is a man-made pattern. And, if yes, the 2×2 coding unit is determined as a man-made coding unit; otherwise, the 2×2 coding unit is determined as a natural coding unit. There are seven man-made patterns, in which the first man-made pattern indicates that the four pixels present two strips in a horizontal direction; the second man-made pattern indicates that the four pixels present two strips in a vertical direction; the third man-made pattern indicates that the four pixels present two strips crossed at a 45 degree direction; the fourth to seventh man-made patterns indicate that the four pixels present a combination of triangle and single point.

More specifically, step S120 determines whether the 2×2 coding unit 220 is one of the first to third man-made patterns, and then determines whether the 2×2 coding unit 220 is one of the fourth to seventh man-made patterns when the 2×2 coding unit 220 is not one of the first to third man-made patterns.

Figure 3:
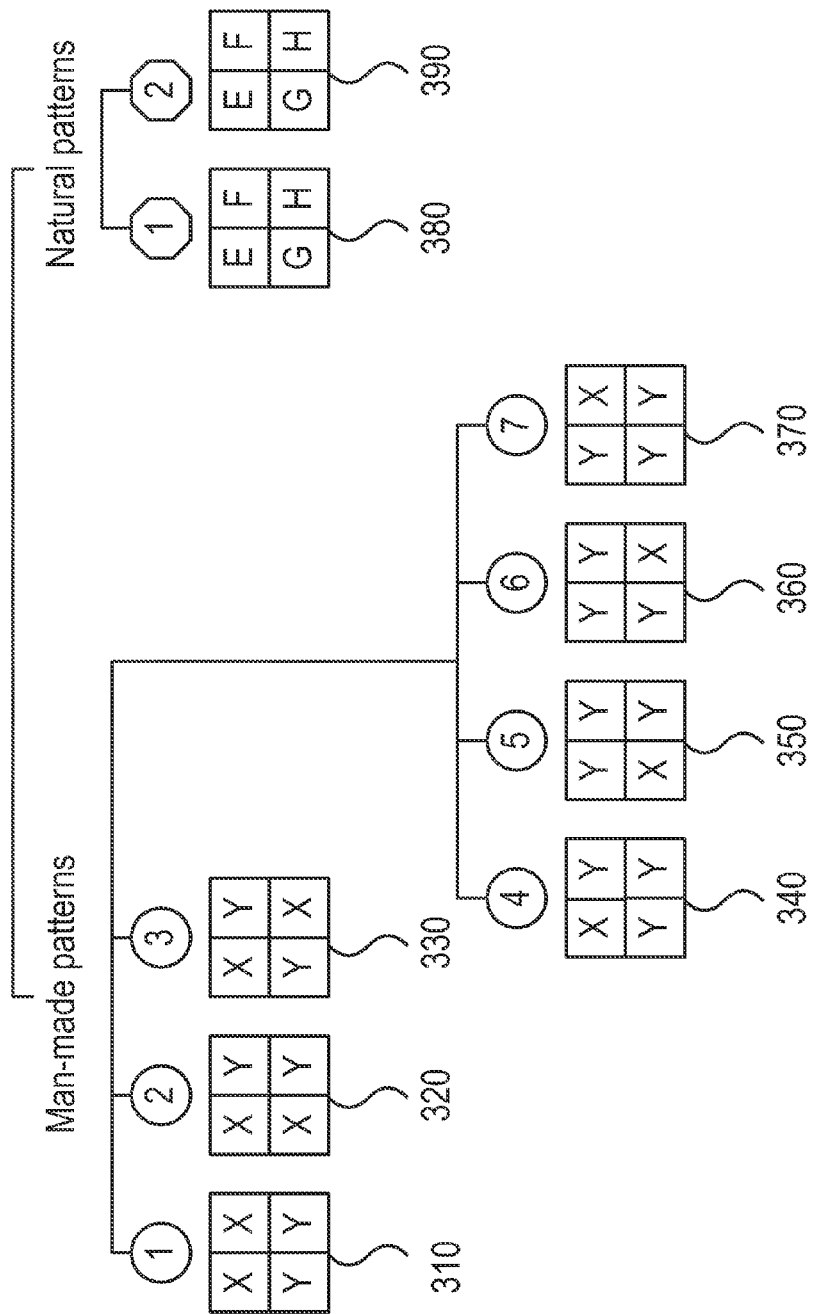
FIG. 3 is a schematic diagram of man-made and natural patterns according to an embodiment of the invention.

FIG. 3 is a schematic diagram of man-made patterns and natural patterns according to an embodiment of the invention. The classification of the first to seven man-made patterns can help with processing special patterns, such as font edge, gray level variation, zigzag, check, and the like, and cooperate with the packet recording scheme in the invention for allowing the coding units to have lossless compression.

As shown in FIG. 3, the first man-made pattern 310 indicates that the four pixels present two strips in a horizontal direction. Namely, the color value (X) of the pixel A is identical or similar to the color value (X) of the pixel B, and the color value (Y) of the pixel C is identical or similar to the color value (Y) of the pixel D. Similarly, the second man-made pattern 320 indicates that the four pixels present two strips in a vertical direction, the third man-made pattern 330 indicates that the four pixels present two strips crossed at 45 degree direction, and the fourth to seventh man-made patterns 340, 350, 360, 370 indicate that the four pixels present a combination of triangle and single point. Namely, the first man-made pattern 310 indicates that the upper left pixel and the upper right pixel are similar (X) and the lower left pixel and the lower right pixel are similar (Y). The second man-made pattern 320 indicates that the upper left pixel and the lower left pixel are similar (X) and the upper right pixel and lower right pixel are similar (Y). The third man-made pattern 330 indicates that the upper left pixel and the lower right pixel are similar (X) and the lower left pixel and the upper right pixel are similar (Y). The fourth man-made pattern 340 indicates that the lower left pixel, the upper right pixel, and the lower right pixel are similar (Y). The fifth man-made pattern 350 indicates that the upper left pixel, the upper right pixel, and the lower right pixel are similar (Y). The sixth man-made pattern 360 indicates that the upper left pixel, the lower left pixel, and the upper right pixel are similar (Y). The seventh man-made pattern 370 indicates that the upper left pixel, the lower left pixel, and the lower right pixel are similar (Y).

In step S120, the 2×2 coding unit 220 is determined to be the first man-made pattern 310 when the following equations are satisfied:

$$ABS(A_r,B_r)<THD1, ABS(C_r,D_r)<THD1,$$

$$ABS(A_g,B_g)<THD1, ABS(C_g,D_g)<THD1,$$

$$ABS(A_b,B_b)<THD1, ABS(C_b,D_b)<THD1,$$

$$ABS(A_r,B_r)+ABS(A_g,B_g)+ABS(A_b,B_b) \leq$$

$$ABS(A_r,C_r)+ABS(A_g,C_g)+ABS(A_b,C_b),$$

$$ABS(A_r,B_r)+ABS(A_g,B_g)+ABS(A_b,B_b) \leq$$

$$ABS(D_r,B_r)+ABS(D_g,B_g)+ABS(D_b,B_b),$$

$$ABS(C_r,D_r)+ABS(C_g,D_g)+ABS(C_b,D_b) \leq$$

$$ABS(D_r,B_r)+ABS(D_g,B_g)+ABS(D_b,B_b),$$

$$ABS(C_r,D_r)+ABS(C_g,D_g)+ABS(C_b,D_b) \leq$$

$$ABS(A_r,C_r)+ABS(A_g,C_g)+ABS(A_b,C_b),$$

where THD1 indicates a first threshold; A indicates the upper left pixel; B indicates the upper right pixel; C indicates the lower left pixel; D indicates the lower right pixel; $A_r$, $A_g$, and $A_b$ indicate red, green, and blue values of a pixel A; $B_r$, $B_g$, and $B_b$ indicate red, green, and blue values of a pixel B; $C_r$, $C_g$, and $C_b$ indicate red, green, and blue values of a pixel C; $D_r$, $D_g$, and $D_b$ indicate red, green, and blue values of a pixel D; ABS( ) indicates an absolute function of the difference between two elements. In this case, ABS(a,b)=a−b when a b, and ABS(a,b)=b−a when a<b.

In step S120, the 2×2 coding unit 220 is determined to be the second man-made pattern 320 when the following equations are satisfied:

$$ABS(A_r,C_r)<THD1, ABS(B_r,D_r)<THD1,$$

$$ABS(A_g,C_g)<THD1, ABS(B_g,D_g)<THD1,$$

$$ABS(A_b,C_b)<THD1, ABS(B_b,D_b)<THD1,$$

$$ABS(A_r,C_r)+ABS(A_g,C_g)+ABS(A_b,C_b) \leq$$

$$ABS(A_r,B_r)+ABS(A_g,B_g)+ABS(A_b,B_b),$$

$$ABS(A_r,C_r)+ABS(A_g,C_g)+ABS(A_b,C_b) \leq$$

$$ABS(D_r,C_r)+ABS(D_g,C_g)+ABS(D_b,C_b),$$

$$ABS(B_r,D_r)+ABS(B_g,D_g)+ABS(B_b,D_b) \leq$$

$$ABS(D_r,C_r)+ABS(D_g,C_g)+ABS(D_b,C_b),$$

$$ABS(B_r,D_r)+ABS(B_g,D_g)+ABS(B_b,D_b) \leq$$

$$ABS(A_r,B_r)+ABS(A_g,B_g)+ABS(A_b,B_b).$$

In step S120, the 2×2 coding unit 220 is determined to be the third man-made pattern 330 when the following equations are satisfied:

$$ABS(A_r,D_r)<THD1, ABS(C_r,B_r)<THD1,$$

$$ABS(A_g,D_g)<THD1, ABS(C_g,B_g)<THD1,$$

$$ABS(A_b,D_b)<THD1, ABS(C_b,B_b)<THD1,$$

$$ABS(A_r,D_r)+ABS(A_g,D_g)+ABS(A_b,D_b) \leq$$

$$ABS(A_r,B_r)+ABS(A_g,B_g)+ABS(A_b,B_b),$$

$$ABS(A_r,D_r)+ABS(A_g,D_g)+ABS(A_b,D_b) \leq$$

$$ABS(D_r,C_r)+ABS(D_g,C_g)+ABS(D_b,C_b),$$

$$ABS(C_r,B_r)+ABS(C_g,B_g)+ABS(C_b,B_b) \leq$$

$$ABS(D_r,C_r)+ABS(D_g,C_g)+ABS(D_b,C_b),$$

$$ABS(C_r,B_r)+ABS(C_g,B_g)+ABS(C_b,B_b) \leq$$

$$ABS(A_r,B_r)+ABS(A_g,B_g)+ABS(A_b,B_b).$$

In step S120, the 2×2 coding unit 220 is determined to be the fourth man-made pattern 340 when the following equations are satisfied:

$$ABS(B_r,D_r)<THD2, ABS(C_r,D_r)<THD2,$$

$$ABS(B_g,D_g)<THD2, ABS(C_g,D_g)<THD2,$$

$$ABS(B_b,D_b)<THD2, ABS(C_b,D_b)<THD2,$$

$$ABS(B_r,D_r)+ABS(B_g,D_g)+ABS(B_b,D_b) \leq$$

$$ABS(A_r,C_r)+ABS(A_g,C_g)+ABS(A_b,C_b),$$

$$ABS(B_r,D_r)+ABS(B_g,D_g)+ABS(B_b,D_b) \leq$$

$$ABS(A_r,B_r)+ABS(A_g,B_g)+ABS(A_b,B_b),$$

$$ABS(C_r,D_r)+ABS(C_g,D_g)+ABS(C_b,D_b) \leq$$

$$ABS(A_r,B_r)+ABS(A_g,B_g)+ABS(A_b,B_b),$$

$$ABS(C_r,D_r)+ABS(C_g,D_g)+ABS(C_b,D_b) \leq$$

$$ABS(A_r,C_r)+ABS(A_g,C_g)+ABS(A_b,C_b),$$

where THD2 indicates a second threshold.

In step S120, the 2×2 coding unit 220 is determined to be the fifth man-made pattern 350 when the following equations are satisfied:

$$ABS(B_r,D_r)<THD2, ABS(A_r,B_r)<THD2,$$

$$ABS(B_g,D_g)<THD2, ABS(A_g,B_g)<THD2,$$

$$ABS(B_b,D_b)<THD2, ABS(A_b,B_b)<THD2,$$

$$ABS(B_r,D_r)+ABS(B_g,D_g)+ABS(B_b,D_b) \leq$$

$$ABS(A_r,C_r)+ABS(A_g,C_g)+ABS(A_b,C_b),$$

$$ABS(B_r,D_r)+ABS(B_g,D_g)+ABS(B_b,D_b) \leq$$

$$ABS(C_r,D_r)+ABS(C_g,D_g)+ABS(C_b,D_b),$$

$$ABS(A_r,B_r)+ABS(A_g,B_g)+ABS(A_b,B_b) \leq$$

$$ABS(C_r,D_r)+ABS(C_g,D_g)+ABS(C_b,D_b),$$

$$ABS(A_r,B_r)+ABS(A_g,B_g)+ABS(A_b,B_b) \leq$$

$$ABS(A_r,C_r)+ABS(A_g,C_g)+ABS(A_b,C_b).$$

In step S120, the 2×2 coding unit 220 is determined to be the sixth man-made pattern 360 when the following equations are satisfied:

$ABS(A_r,C_r)<THD2, ABS(A_r,B_r)<THD2,$ $ABS(A_g,C_g)<THD2, ABS(A_g,B_g)<THD2,$ $ABS(A_b,C_b)<THD2, ABS(A_b,B_b)<THD2,$ $ABS(A_r,C_r)+ABS(A_g,C_g)+ABS(A_b,C_b) \leq$ $ABS(B_r,D_r)+ABS(B_g,D_g)+ABS(B_b,D_b),$ $ABS(A_r,C_r)+ABS(A_g,C_g)+ABS(A_b,C_b) \leq$ $ABS(C_r,D_r)+ABS(C_g,D_g)+ABS(C_b,D_b),$ $ABS(A_r,B_r)+ABS(A_g,B_g)+ABS(A_b,B_b) \leq$ $ABS(C_r,D_r)+ABS(C_g,D_g)+ABS(C_b,D_b),$ $ABS(A_r,B_r)+ABS(A_g,B_g)+ABS(A_b,B_b) \leq$ $ABS(B_r,D_r)+ABS(B_g,D_g)+ABS(B_b,D_b).$ In step S120, the 2×2 coding unit 220 is determined to be the seventh man-made pattern 370 when the following equations are satisfied:

$ABS(A_r,C_r)<THD2, ABS(C_r,D_r)<THD2,$ $ABS(A_g,C_g)<THD2, ABS(C_g,D_g)<THD2,$ $ABS(A_b,C_b)<THD2, ABS(C_b,D_b)<THD2,$ $ABS(A_r,C_r)+ABS(A_g,C_g)+ABS(A_b,C_b) \leq$ $ABS(B_r,D_r)+ABS(B_g,D_g)+ABS(B_b,D_b),$ $ABS(A_r,C_r)+ABS(A_g,C_g)+ABS(A_b,C_b) \leq$ $ABS(A_r,B_r)+ABS(A_g,B_g)+ABS(A_b,B_b),$ $ABS(C_r,D_r)+ABS(C_g,D_g)+ABS(C_b,D_b) \leq$ $ABS(A_r,B_r)+ABS(A_g,B_g)+ABS(A_b,B_b),$ $ABS(C_r,D_r)+ABS(C_g,D_g)+ABS(C_b,D_b) \leq$ $ABS(B_r,D_r)+ABS(B_g,D_g)+ABS(B_b,D_b).$ In step S130, a differential error encoding and a quantization and lookup are performed on the 2×2 coding unit of the man-made pattern for generating a first coded data.

Figure 4:
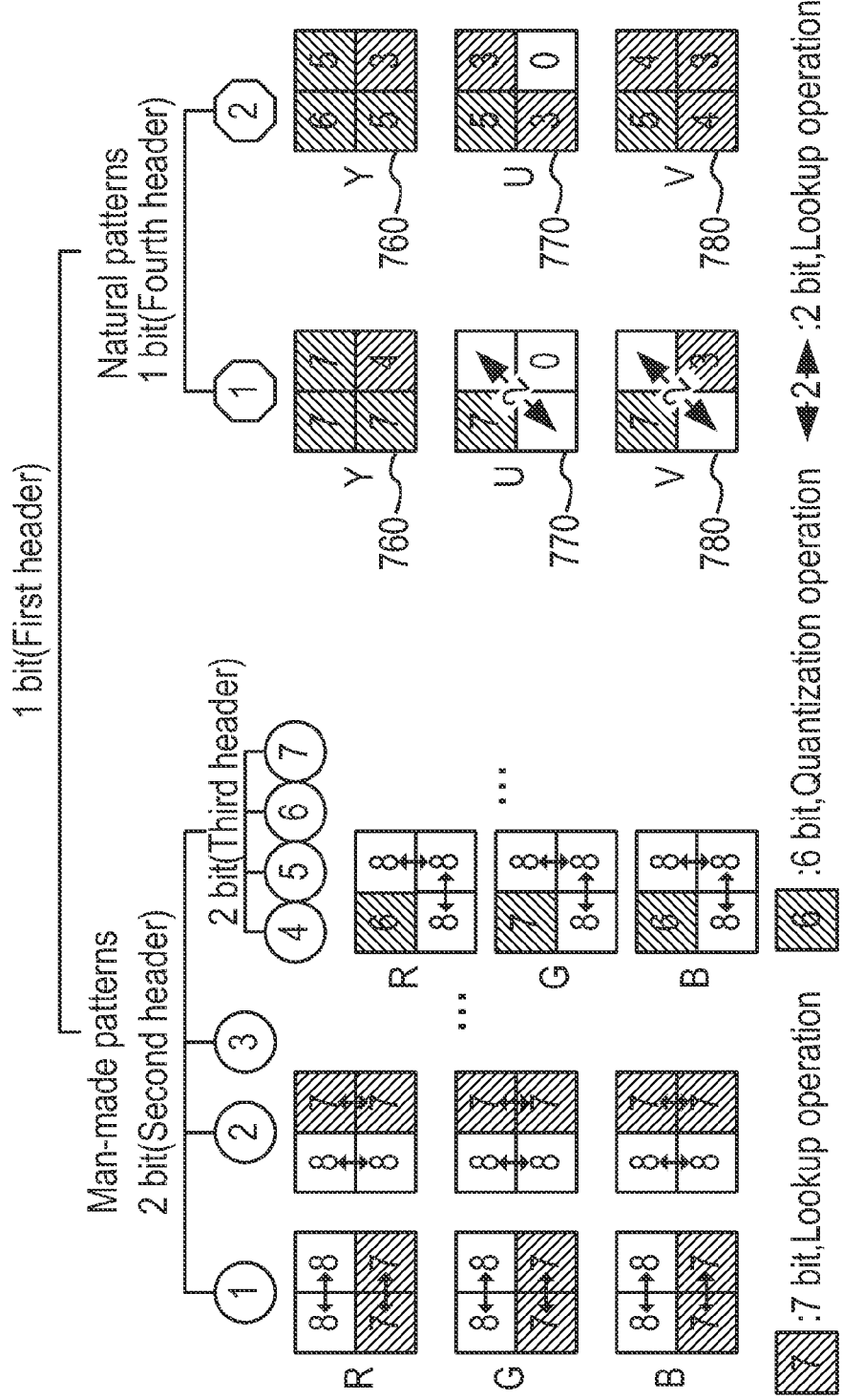
FIG. 4 is a schematic diagram of a differential error encoding and a quantization and look-up performed on the 2×2 coding unit according to an embodiment of the invention.

FIG. 4 is a schematic view illustrating the differential error encoding and the quantization and look-up performed on the 2×2 coding unit according to an embodiment of the invention. In FIG. 4, numbers indicate bit numbers. For example, number 8 indicates eight bits, and number 7 indicates seven bits. The reverse slope symbol indicates a table lookup operation, and the slope symbol indicates a quantization operation.

When the 2×2 coding unit 220 is one of the first, the second, and the third man-made patterns 310, 320, and 330, eight bits are employed to record the average of two pixels, and seven bits are employed to record the location of a 7-bit table. The recorded content of the location of the 7-bit table shows the one, in all the recorded content of the 7-bit table, that is closest to the result of subtracting the average of the two pixels recorded by eight bits from the average of the other two pixels of the 2×2 coding unit.

The first, the second, and the third man-made patterns 310, 320, and 330 each are of a line form, and thus only the first man-made pattern 310 is described while a detailed description to the second and the third man-made patterns 320 and 330 is deemed unnecessary.

Figure 5:
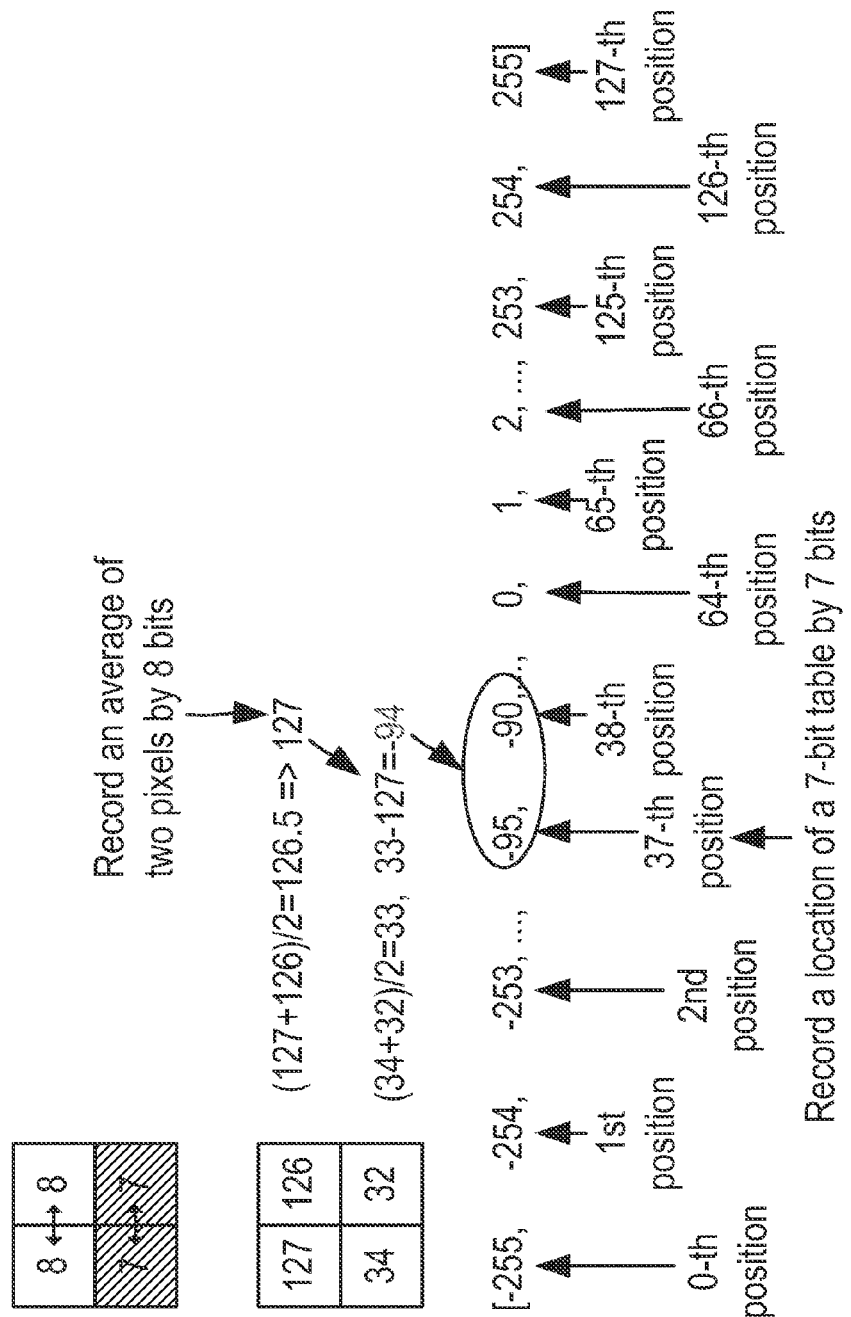
FIG. 5 is a schematic diagram of coding performed when a 2×2 coding unit is one of first to third man-made patterns according to an embodiment of the invention.

FIG. 5 is a schematic diagram of coding performed when the 2×2 coding unit is one of the first, second and third man-made patterns according to an embodiment of the invention. In FIG. 5, either red, blue, or green colors can be used, and in this case a color value 127 of pixel A and a color value 126 of pixel B are averaged (to have 126.5) and rounded to thereby obtain a value 127, which is recorded it by eight bits.

Similarly, a color value 34 of pixel C and a color value 32 of pixel D are averaged (to have 33) and rounded to thereby obtain a value 33. The obtained values are subtracted to thereby obtain a value −94, i.e., 33-127=−94. The subtracted result is expressed by 9 bits. However, for reducing the amount of data after the coding is performed, the 7-bit table is used. The lookup table operation is performed on the value −94, which is positioned between −95 and −90 in the 7-bit table and is closer to −95. Accordingly, the position of −95 is recorded by 7 bits.

The 7-bit table records 128 values, and if −95 is closest to the j-th value of the 7-bit table, "j" is recorded. The value of "j" can be calculated by equation (1) as follows:

$$[a_1, a_2, a_3, \ldots, a_{k-2}, a_{k-1}, a_k],$$

$$\text{sign}[\alpha-a_j] \times \text{sign}[a_{j+1}-\alpha] \geq 0, \quad (1)$$

where $a_1$ to $a_k$ indicate 128 values recorded from small to big in the 7-bit table, sign[ ] indicates a sign function of an output value, and α indicates a desired lookup value. Once equation (1) is satisfied, the value of "j" is stored.

When the 2×2 coding unit is one of the fourth, the fifth, the sixth, and the seventh man-made patterns 340, 350, 360, and 370, eight bits are employed to record an average of three pixels of the 2×2 coding unit, and seven bits or six bits are employed to record the quantized value of the remaining pixel.

The fourth, the fifth, the sixth, and the seventh man-made patterns 340, 350, 360, and 370 each are a combination of triangle and single point, and thus only the fourth man-made pattern 340 is described, while a detailed description to the fifth, the sixth, and the seventh man-made patterns 350, 360, and 370 is deemed unnecessary.

Figure 6:
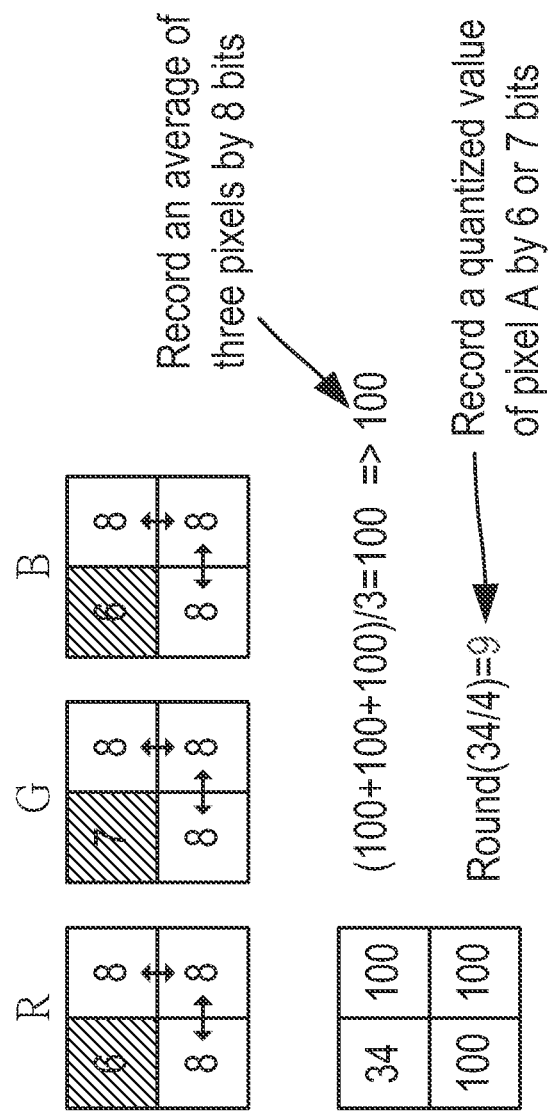
FIG. 6 is a schematic diagram of coding performed when a 2×2 coding unit is one of fourth to seventh man-made patterns according to an embodiment of the invention.

FIG. 6 is a schematic diagram of coding performed when the 2×2 coding unit is one of the fourth, fifth, sixth and seventh man-made patterns according to an embodiment of the invention. In FIG. 6, either red, blue, or green color can be used, and in this case a color value 100 of pixel B, a color value 100 of pixel C, and a color value 100 of pixel D are averaged (to have 100) and rounded to thereby obtain a value 100, which is recorded by eight bits.

The color value 34 of pixel A is performed with a quantization operation, which is rounded to thereby obtain a value 9. Accordingly, six bits are employed to record the value 9. When the pixel A has a green color, seven bits are employed to record the value 9. The quantization operation can be expressed as follows:

$$x_Q = \text{Round}\left(\frac{x}{Q}\right)$$

where Q indicates a quantization factor, and Round( ) indicates a round function. When six bits are used for recording, the quantization factor Q is 4. When seven bits are used for recording, the quantization factor Q is 2.

When step S120 determines that the 2×2 coding unit is not one of the first to seventh man-made patterns, it indicates that the 2×2 coding unit is a natural pattern. Therefore, step S140 performs a color domain transform on the 2×2 coding unit of the natural pattern for generating a 2×2 color domain transform unit.

Figure 7:
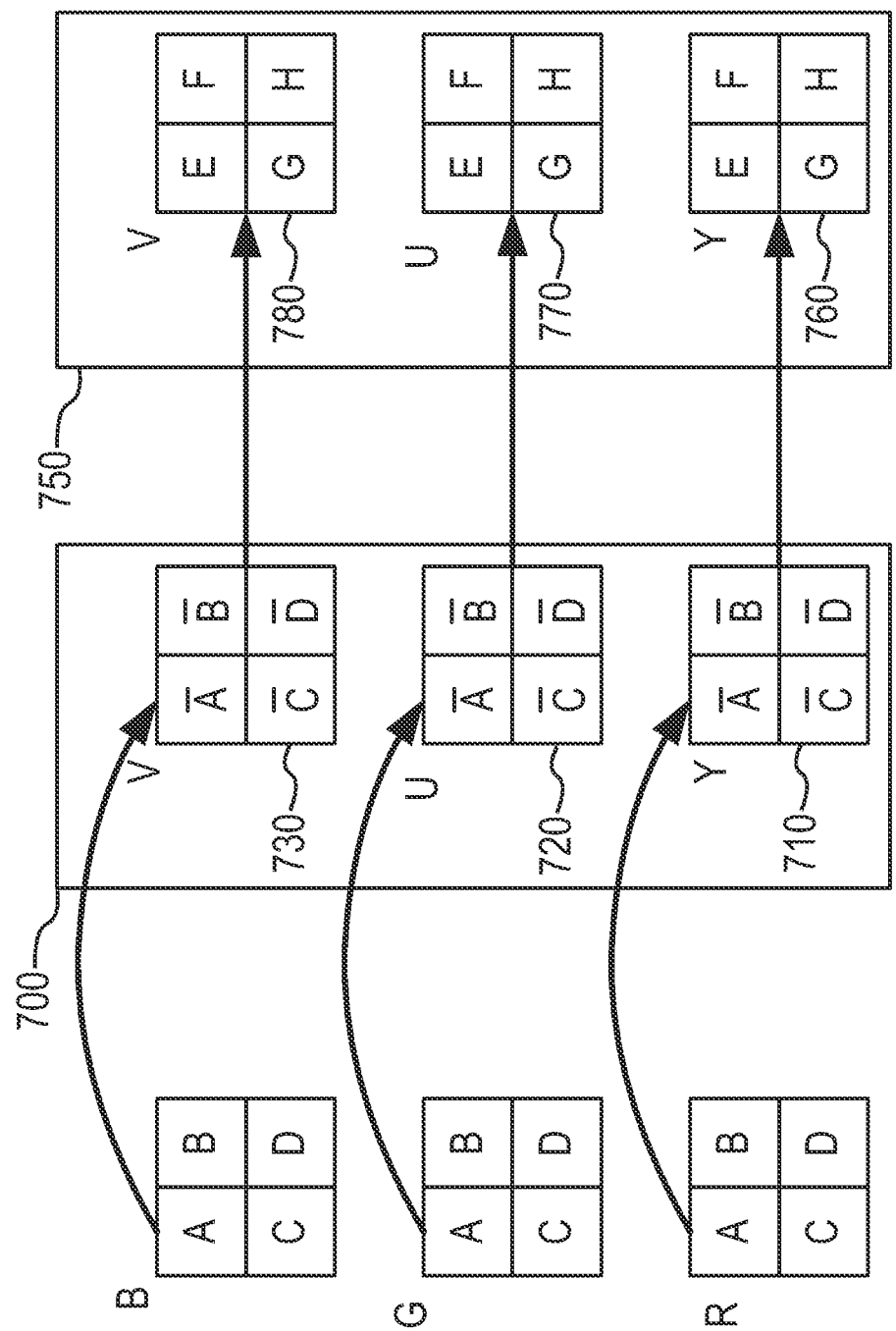
FIG. 7 is a schematic diagram of a transformation according to an embodiment of the invention.

In step S140, an RGB to YUV color domain transform is performed to thereby obtain the 2×2 color domain transform unit. The RGB to YUV color domain transform can be expressed as follows:

$$\begin{bmatrix} Y \\ U \\ V \end{bmatrix} = \begin{bmatrix} 0.25 & 0.5 & 0.25 \\ -0.5 & 1.0 & -0.5 \\ -1.0 & 0 & 1.0 \end{bmatrix} \begin{bmatrix} r \\ g \\ b \end{bmatrix},$$

where r indicates a red value of a pixel, g indicates a green value of the pixel, b indicates a blue value of the pixel, Y indicates a luminance (luma) of the pixel, and U, V indicate a chrominance (chroma) of the pixel. FIG. 7 is a schematic diagram of a transformation according to an embodiment of the invention. As shown in FIG. 7, the 2×2 color domain transform unit 700 includes a 2×2 luminance transform unit 710, a first 2×2 chrominance transform unit 720, and a second 2×2 chrominance transform unit 730.

The elements of the 2×2 luminance transform unit 710 have values ranging from zero to 255, and the elements of the first 2×2 chrominance transform unit 720 and second 2×2 chrominance transform unit 730 have values ranging from −255 to 255. Accordingly, the elements of the 2×2 luminance transform unit 710 can be expressed by eight bits, and the elements of the first 2×2 chrominance transform unit 720 and second 2×2 chrominance transform unit 730 can be expressed by nine bits. However, this is only a calculation process and does not influence the bit number in coding. Before step S150, it is necessary to shift the values of the elements of the 2×2 luminance transform unit 710 from 0 to 255 to −128 to 127.

In step S150, a discrete cosine transform is performed on the 2×2 color domain transform unit 700 for generating a 2×2 frequency domain unit.

In step S150, the discrete cosine transform is expressed as follows:

$$\begin{bmatrix} E \\ F \\ G \\ H \end{bmatrix} = 0.25 \times \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} \overline{A} \\ \overline{B} \\ \overline{C} \\ \overline{D} \end{bmatrix}, \quad (2)$$

where $\overline{A}$ indicates a value on an upper left corner of the 2×2 color domain transform unit 700, $\overline{B}$ indicates a value on an upper right corner of the 2×2 color domain transform unit 700, $\overline{C}$ indicates a value on a lower left corner of the 2×2 color domain transform unit 700, $\overline{D}$ indicates a value on a lower right corner of the 2×2 color domain transform unit 700, E indicates a value on an upper left corner of the 2×2 frequency domain unit 750, F indicates a value on an upper right corner of the 2×2 frequency domain unit 750, G indicates a value on a lower left corner of the 2×2 frequency domain unit 750, and H indicates a value on a lower right corner of the 2×2 frequency domain unit 750. The 2×2 frequency domain unit 750 includes a 2×2 frequency domain luminance unit 760, a first 2×2 frequency domain chrominance unit 770, and a second 2×2 frequency domain chrominance unit 780.

The elements of the 2×2 frequency domain luminance unit 760 have values ranging from −128 to 127, and the elements of the first 2×2 frequency domain chrominance unit 770 and the second 2×2 frequency domain chrominance unit 780 have values ranging from −255 to 255. Accordingly, the elements of the 2×2 frequency domain luminance unit 760 can be expressed by eight bits, and the elements of the first 2×2 frequency domain chrominance unit 770 and second 2×2 frequency domain chrominance unit 780 can be expressed by nine bits. However, this is only a calculation process and does not influence the bit number in coding.

The transform matrix in equation (2) can be obtained by a 2D discrete cosine transform expressed in equation (3) as follows:

$$F(u, v) = \frac{1}{\sqrt{2N}} c(u) c(v) \sum_{x=0}^{N-1} \sum_{y=0}^{N-1} f(x, y) \cos\left(\frac{(2x+1)u\pi}{2N}\right) \cos\left(\frac{(2y+1)v\pi}{2N}\right), \quad (3)$$

where $$c(u) = \begin{cases} \frac{1}{\sqrt{2}}, & \text{when } u = 0 \\ 1, & \text{when } u \neq 0, \end{cases} \quad c(v) = \begin{cases} \frac{1}{\sqrt{2}}, & \text{when } v = 0 \\ 1, & \text{when } v \neq 0, \end{cases}$$

u, v indicate discrete frequency variables ranging from zero to N−1, f(x, y) indicates N×N pixels, and F(u, v) indicates a result after the 2D discrete cosine transform. In this embodiment, N=2, and the transform matrix in equation (2) is obtained.

In step S160, the 2×2 frequency domain unit 750 is divided into a first natural pattern 380 and a second natural pattern 390. When elements F and G of the first 2×2 frequency domain chrominance unit 770 satisfy an inequality:

max(ABS(F,0),ABS(G,0))<THD3, and elements F and G of the second 2×2 frequency domain chrominance unit 780 satisfy an inequality:

max(ABS(F,0),ABS(G,0))<THD4, the 2×2 frequency domain unit 750 is determined to be the first natural pattern 380 and, otherwise, the 2×2 frequency domain unit 750 is determined to be the second natural pattern 390, where THD3 indicates a third threshold, THD4 indicates a fourth threshold, and THD4>THD3.

Step S170 performs a quantization and lookup on the 2×2 frequency domain unit 750 for generating a second coded data.

In step S170, when the 2×2 frequency domain unit 750 is the first natural pattern 380, each of the elements E, F, G of the 2×2 frequency domain luminance unit 760 is recorded by seven bits, and the location of a 4-bit table is recorded by four bits. The recorded content of the location of the 4-bit table shows the one, in all the recorded content of the 4-bit table, that is closest to the value of the element H of the 2×2 frequency domain luminance unit 760.

The elements of the 2×2 frequency domain luminance unit 760 have values ranging from −128 to 127, and in this case a shift operation is performed, so as to shift the elements of the 2×2 frequency domain luminance unit 760 from −128 to 127 to 0 to 255. In step S170, a quantization operation is performed on the values of the elements E, F, G, a round operation is performed after the quantization operation, and the result is recorded by seven bits. However, the value of each of the elements E, F, G of the 2×2 frequency domain luminance unit 760 is expressed by eight bits. When seven bits are used for recording, the quantization factor Q is 2. The element H of the 2×2 frequency domain luminance unit 760 applies a 4-bit table for a lookup operation, as same as that applied in the 7-bit table, and thus a detailed description is deemed unnecessary.

In step S170, when the 2×2 frequency domain unit 750 is the first natural pattern 380, the element E of the first 2×2 frequency domain chrominance unit 770 is recorded by seven bits, and the location of a 2-bit table is recorded by two bits. The recorded content of the location of the 2-bit table shows the one, in all the recorded content of the 2-bit table, that is closest to the average of the elements F and G of the first 2×2 frequency domain chrominance unit 770, and the element H of the first 2×2 frequency domain chrominance unit 770 is not recorded.

The elements of the first 2×2 frequency domain chrominance unit 770 have values ranging from −255 to 255. In this case, a shift operation is performed, so as to shift the values of the elements of the first 2×2 frequency domain chrominance unit 770 from −255 to 255 to 0 to 510. Accordingly, the element of the first 2×2 frequency domain chrominance unit 770 is expressed by nine bits. A quantization operation is first performed as the element E of the first 2×2 frequency domain chrominance unit 770 is recorded by seven bits, and the quantization factor Q is 4.

The elements F and G of the first 2×2 frequency domain chrominance unit 770 are averaged and applied in the 2-bit table for a lookup operation, as same as that applied in the 7-bit table, and thus a detailed description is deemed unnecessary.

In step 170, when the 2×2 frequency domain unit 750 is the first natural pattern 380, the element E of the second 2×2 frequency domain chrominance unit 780 is recorded by seven bits, and the location of a 2-bit table is recorded by two bits. The recorded content of the location of the 2-bit table shows the one, in all the recorded content of the 2-bit table, that is closest to the average of the elements F and G of the second 2×2 frequency domain chrominance unit 780. The location of a 3-bit table is recorded by three bits, and the recorded content of the location of the 3-bit table shows the one, in all the recorded content of the 3-bit table, that is closest to the value of the element H of the second 2×2 frequency domain chrominance unit 780.

The elements of the second 2×2 frequency domain chrominance unit 780 have values ranging from −255 to 255, and in this case a shift operation is performed, so as to shift the values of the elements of the second 2×2 frequency domain chrominance unit 780 from −255 to 255 to 0 to 510. Accordingly, the element of the second 2×2 frequency domain chrominance unit 780 is expressed by nine bits. A quantization operation is first performed as the element E of the second 2×2 frequency domain chrominance unit 780 is recorded by seven bits, and in this case the quantization factor Q is 4.

The elements F and G of the second 2×2 frequency domain chrominance unit 780 are averaged and applied in the 2-bit table for a lookup operation, as same as that applied in the 7-bit table, as well as the 3-bit table, and thus a detailed description is deemed unnecessary.

In step S170, when the 2×2 frequency domain unit 750 is the second natural pattern 390, the quantized value of the element E of the 2×2 frequency domain luminance unit 760 is recorded by six bits, the quantized value of the element F of the 2×2 frequency domain luminance unit 760 is recorded by five bits, the quantized value of the element G of the 2×2 frequency domain luminance unit 760 is recorded by five bits, and the location of a 3-bit table is recorded by three bits. The recorded content of the location of the 3-bit table shows the one, in all the recorded content of the 3-bit table, that is closest to the value of the element H of the 2×2 frequency domain luminance unit 760. The quantization factors and corresponding lookup operations are well known to those skilled in the art, and thus a detailed description is deemed unnecessary.

In step S170, when the 2×2 frequency domain unit 750 is the second natural pattern 390, the quantized value of the element E of the first 2×2 frequency domain chrominance unit 770 is recorded by five bits; the location of a 3-bit table is recorded by three bits such that the recorded content of the location of the 3-bit table shows the one, in all the recorded content of the 3-bit table, that is closest to the value of the element F of the first 2×2 frequency domain chrominance unit 770. The location of a 3-bit table is recorded by three bits such that the recorded content of the location of the 3-bit table shows the one, in all the recorded content of the 3-bit table, that is closest to the value of the element G of the first 2×2 frequency domain chrominance unit 770. The element H of the first 2×2 frequency domain chrominance unit 770 is not recorded.

In step S170, when the 2×2 frequency domain unit 750 is the second natural pattern 390, the quantized value of the element E of the second 2×2 frequency domain chrominance unit 780 is recorded by five bits. The location of a 4-bit table is recorded by four bits, and the recorded content of the location of the 4-bit table shows the one, in all the recorded content of the 4-bit table, that is closest to the value of the element F of the second 2×2 frequency domain chrominance unit 780. The location of a 4-bit table is recorded by four bits, and the recorded content of the location of the 4-bit table shows the one, in all the recorded content of the 4-bit table, that is closest to the value of the element G of the second 2×2 frequency domain chrominance unit 780. The location of a 3-bit table is recorded by three bits, and the recorded content of the location of the 3-bit table shows the one, in all the recorded content of the 3-bit table, that is closest to the value of the element H of the second 2×2 frequency domain chrominance unit 780.

In step S180, the first or second coded data is received and the received first or second coded data is packaged to thereby generate a coded packet with a fixed bit size.

As shown in FIG. 4, step S180 uses one bit (first header) to record that the 2×2 coding unit 220 is a man-made pattern or natural pattern, then uses two bits (second header) to record that the 2×2 coding unit 220 is first man-made pattern, second man-made pattern, third man-made pattern, or one of fourth to seventh man-made patterns, and finally uses two bits (third header) to record that the 2×2 coding unit 220 is fourth, fifth, sixth, or seventh man-made pattern. When the 2×2 coding unit 220 is the first, second, or third man-made pattern, the bit number is 48 bits (=1+2+8+7+8+7+8+7) after the coding and packaging operation. When the 2×2 coding unit 220 is the fourth, fifth, sixth, or seventh man-made pattern, the bit number is still 48 bits (=1+2+2+8+7+8+6+8+6) after the coding and packaging operation. When the 2×2 coding unit 220 is the natural pattern, one bit is used to record that the 2×2 coding unit 220 is the first natural pattern or the second natural pattern. When the 2×2 coding unit 220 is the first natural pattern, the bit number is still 48 bits (=1+1+3x7+4+7+2+7+2+3) after the coding and packaging operation. When the 2×2 coding unit 220 is the second natural pattern, the bit number is still 48 bits (=1+1+6+5+5+3+5+3+5+4+4+3) after the coding and packaging operation.

Figure 8:
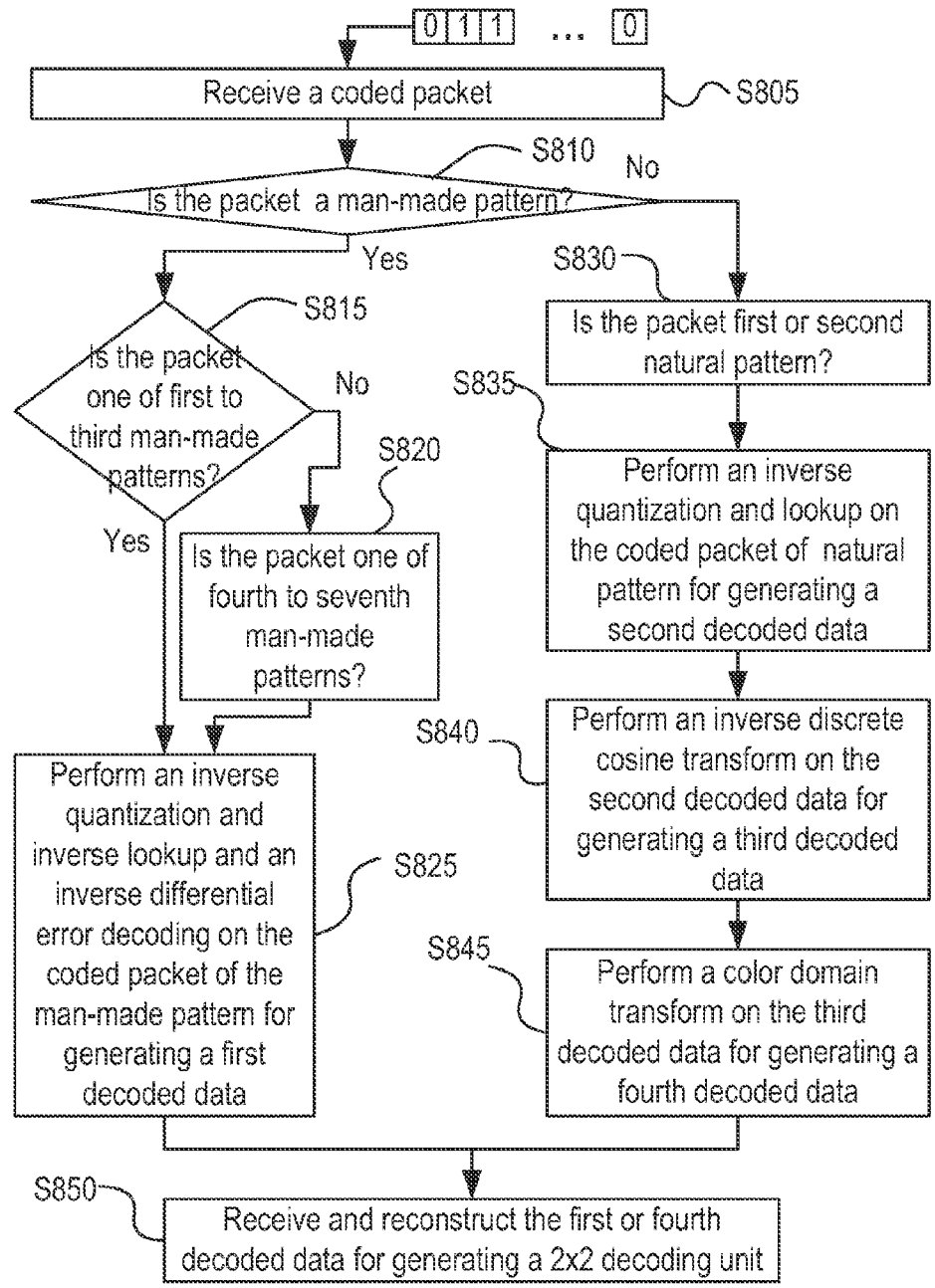
FIG. 8 is a flowchart of a method of fixed bit-rate image decompression based on 2×2 image unit according to an embodiment of the invention.

FIG. 8 is a flowchart of a method of fixed bit-rate image decompression based on 2×2 image unit according to an embodiment of the invention. In FIG. 8, a packet with a fixed bit size is decoded to generate a 2×2 decoding unit of an image. The 2×2 decoding unit includes four pixels in a matrix arrangement, and the image has a plurality of 2×2 decoding units.

In the method, step S805 receives a coded packet at first.

Step S810 is based on a main header (one bit) of the coded packet to determine whether the coded packet is a man-made pattern. If yes, the coded packet of a man-made pattern is determined and, otherwise, the 2×2 coded packet of a natural pattern is determined.

When the coded packet of a man-made pattern is determined, step S815 is based on a first header (two bits) of the coded packet to determine whether the coded packet has one of the first to third man-made patterns. The first man-made pattern indicates that four pixels present two strips in a horizontal direction. The second man-made pattern indicates that the four pixels present two strips in a vertical direction. The third man-made pattern indicates that the four pixels present two strips crossed at 45 degree direction.

When step S815 determines that the coded packet is not one of the first to third man-made patterns, step S820 is based on the second header (two bits) and the third (two bits) of the coded packet to determine whether the coded packet is one of fourth to seventh man-made patterns. The fourth to seventh man-made patterns indicate that the four pixels present a combination of triangle and single point. The fourth man-made pattern indicates that the lower left pixel, the upper right pixel, and the lower right pixel are similar. The fifth man-made pattern indicates that the upper left pixel, the upper right pixel, and the lower right pixel are similar. The sixth man-made pattern indicates that the upper left pixel, the lower left pixel, and the upper right pixel are similar. The seventh man-made pattern indicates that the upper left pixel, the lower left pixel, and the lower right pixel are similar.

Step S825 performs an inverse quantization and inverse lookup and an inverse differential error decoding on the coded packet of the man-made pattern for generating a first decoded data.

Step S830 is based on a fourth header (one bit) of the coded packet to further determine whether the coded packet is first or second natural pattern.

Step S835 performs an inverse quantization and lookup on the coded packet of the natural pattern for generating a second decoded data.

Step S840 performs a inverse discrete cosine transform on the second decoded data for generating a third decoded data. In step S840, the transform matrix coefficients of the inverse discrete cosine transform can be expressed as follows:

$$\begin{bmatrix} \overline{A} \\ \overline{B} \\ \overline{C} \\ \overline{D} \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} E \\ F \\ G \\ H \end{bmatrix},$$

where E, F, G and H indicate the second decoded data, and $\overline{A}$, $\overline{B}$, $\overline{C}$ and $\overline{D}$ indicate the third decoded data.

Step S845 performs a color domain transform on the third decoded data for generating a fourth decoded data. In step S845, the color domain transform is a YUV to RGB color domain transform. The transform matrix coefficients of the YUV to RGB color domain transform can be expressed as follows:

$$\begin{bmatrix} r \\ g \\ b \end{bmatrix} = \begin{bmatrix} 1.0 & -0.5 & -0.5 \\ 1.0 & 0.5 & 0 \\ 1.0 & -0.5 & 0.5 \end{bmatrix} \begin{bmatrix} Y \\ U \\ V \end{bmatrix},$$

where Y indicates a luminance of a pixel of the third decoded data, U and V indicate a chrominance of the pixel, r indicates a red value of a pixel of the fourth decoded data, g indicates a green value of the pixel, and b indicates a blue value of the pixel.

Step S850 receives and reconstructs the first or fourth decoded data for generating a 2×2 decoding unit.

Figure 9:
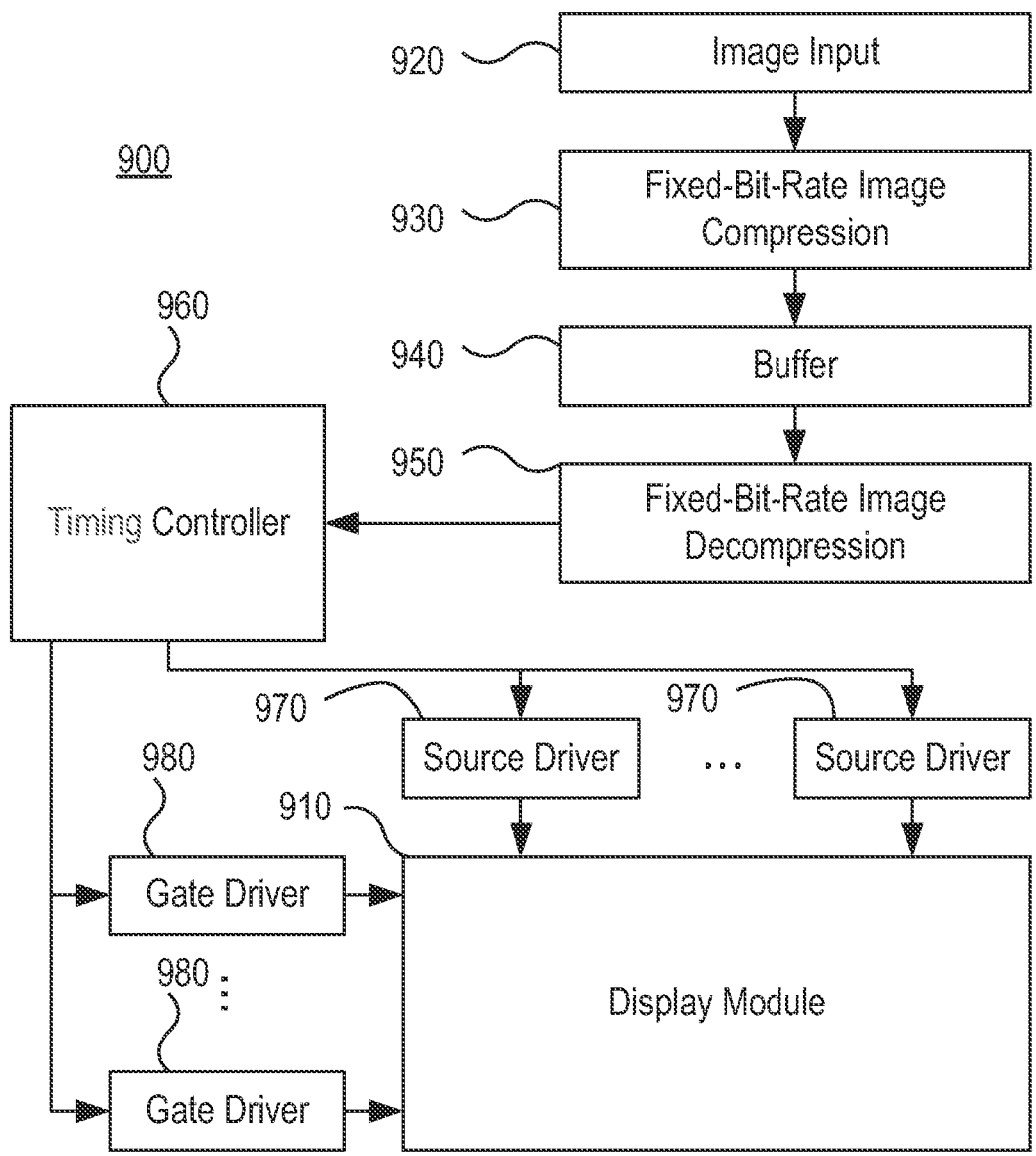
FIG. 9 is a block diagram of an apparatus of fixed bit-rate image compression/decompression based on 2×2 image unit according to an embodiment of the invention.

FIG. 9 is a block diagram of an apparatus of fixed bit-rate image compression/decompression based on 2×2 image unit according to an embodiment of the invention, which performs a compression/decompression operation on an image. As shown in FIG. 9, the apparatus includes a display module 910, an image input device 920, a fixed-bit-rate image compression device 930, a buffer 940, a fixed-bit-rate image decompression device 950, a timing controller 960, a plurality of source drivers 970, and a plurality of gate drivers 980.

The display module 910 is provided to display an image. The image input device 920 is provided to input the image. The fixed-bit-rate image compression device 930 is connected to the image input device 920 in order to encode a 2×2 coding unit of the image for generating a coded packet corresponding to the 2×2 coding unit. The image has a plurality of 2×2 coding units.

The buffer 940 is connected to the fixed-bit-rate image compression device 930 in order to temporarily store the coded packet outputted by the fixed-bit-rate image compression device 930.

The fixed-bit-rate image decompression device 950 is connected to the buffer 940 in order to receive and decompress the coded packet for generating a 2×2 decoding unit corresponding to the 2×2 coding unit.

The timing controller 960 is connected to the fixed-bit-rate image decompression device 950 in order to receive the 2×2 decoding unit for generating a clock driving signal and display data of the display module.

The source drivers 970 and the gate drivers 980 are connected to the timing controller 960 in order to receive the clock driving signal and display data outputted by the timing controller 960 for further driving the display module 910.

The fixed-bit-rate image compression device 930 first determines whether the 2×2 coding unit is a man-made or natural pattern. When the 2×2 coding unit is a man-made pattern, a differential error encoding and a quantization and look-up are performed on the 2×2 coding unit for generating a first coded data. Otherwise, the 2×2 coding unit is a natural pattern, and a color domain transform, a discrete cosine transform, and a quantization and look-up are sequentially performed on the 2×2 coding unit for generating a second coded data. The first or second coded data is packaged for generating the coded packet with a fixed bit rate. The 2×2 coding unit has a bit number of 96 bits, and the coded packet corresponding to the 2×2 coding unit has a bit number of 48 bits.

As cited, the invention uses a size of 2×2 pixels as a coding unit in appropriate grouping and bit number arrangement, and accordingly the insensitive components to the eyesight response are appropriately eliminated. Thus, the image compression and quality are obtained.

The coding unit can be grouped into a man-made pattern, which can help with processing special patterns, such as font edge, gray level variation, zigzag, check, and the like and cooperate with the packet recording scheme in the invention, thereby allowing the coding units to have the lossless compression.

For a natural pattern, the color components, i.e., UV, of YUV obtained by the color domain transform, have the lower sensitivity to the eyesight response. In this case, the bit number discarded or recording the corresponding frequency domain elements is smaller in packaging. In addition, the elements after the discrete cosine transform is in frequency domain in which high frequency elements have the lower sensitivity to the eyesight response and can be recorded by smaller bit number to thereby maintain the sensitive information at the eyesight response.

Furthermore, in steps S140, 150, 840, and 850, the color domain transform or discrete cosine transform has the transform matrix coefficients of ±1, 0.25, ±0.5, and the hardware can be carried out by simply replacing a multiplier with one or more shifters to thereby save the hardware cost.

In addition, for the applications of mobile phones, a mobile phone typically has the lossless compression and decompression for test patterns such as man-made grey levels and checkerboard, and reduces the memory amount required for storing images in the mobile phone. Each of the 2×2 coding units is operated independently in compression and decompression, without referring to another 2×2 coding unit, and has a fixed bit rate of 0.5 (=48/96) in real-time compression and decompression, without referring to a previous packet/pixel/frame. Namely, a single coded packet is complete by entering a single coding unit, and similarly a single decoding unit can be obtained from a single coded packet to be entered and decompressed. Accordingly, the invention is suitable for special random access applications such as partially updating the frames in a display memory of a mobile phone.

Although the present invention has been explained in relation to its preferred embodiment, it is to be understood that many other possible modifications and variations can be made without departing from the spirit and scope of the invention as hereinafter claimed.

What is claimed is:

1. A method of fixed bit-rate image compression which encodes a plurality of 2×2 coding units from an image, wherein the 2×2 coding units contains an upper left pixel, an upper right pixel, a lower left pixel, and a lower right pixel in a matrix arrangement, the method comprising the steps of:
   (A) receiving the plurality of 2×2 coding unit respectively;
   (B) determining whether the 2×2 coding unit is a man-made pattern and, if yes, the 2×2 coding unit being determined to be the man-made pattern, otherwise the 2×2 coding unit being determined to be a natural pattern, wherein the man-made pattern includes a first man-made pattern which indicates that the four pixels present two strips in a horizontal direction, a second man-made pattern which indicates that the four pixels present two strips in a vertical direction, a third man-made pattern which indicates that the four pixels present two strips crossed at 45 degree direction, and fourth to seventh man-made patterns which indicate that the four pixels present a combination of triangle and single point;
   (C) performing a differential error encoding and a quantization and lookup on the 2×2 coding unit of man-made pattern for generating a first coded data;
   (D) performing a color domain transform on the 2×2 coding unit of natural pattern for generating a 2×2 color domain transform unit;
   (E) performing a discrete cosine transform on the 2×2 color domain transform unit for generating a 2×2 frequency domain unit; and
   (F) performing the quantization and lookup on the 2×2 frequency domain unit for generating a second coded data.

2. The method as claimed in claim 1, wherein step (B) further first determines whether the 2×2 coding unit is one of the first to the third man-made patterns, and then determines whether the 2×2 coding unit is one of the fourth to the seventh man-made patterns.

3. The method as claimed in claim 1, wherein the first man-made pattern indicates that the upper left and right pixels are similar and the lower left and right pixels are similar; the second man-made pattern indicates that the upper and lower left pixels are similar and the upper and lower right pixels are similar; the third man-made pattern indicates that the upper left and lower right pixels are similar and the lower left and upper right pixels are similar; the fourth man-made pattern indicates that the lower left, upper right, and lower right pixels are similar; the fifth man-made pattern indicates that the upper left, upper right, and lower right pixels are similar; the sixth man-made pattern indicates that the upper left, lower left, and upper right pixels are similar; and the seventh man-made pattern indicates that the upper left, lower left, and lower right pixels are similar.

4. The method as claimed in claim 3, further comprising the step of:
   (G) receiving and packaging the first or second coded data for generating a coded packet with a fixed bit rate.

5. The method as claimed in claim 4, wherein the 2×2 coding unit is determined to be the first man-made pattern in step (B) when satisfying following equations:

$ABS(A_r,B_r)<THD1, ABS(C_r,D_r)<THD1,$ $ABS(A_g,B_g)<THD1, ABS(C_g,D_g)<THD1,$ $ABS(A_b,B_b)<THD1, ABS(C_b,D_b)<THD1,$ $ABS(A_r,B_r)+ABS(A_g,B_g)+ABS(A_b,B_b) \leq$ $ABS(A_r,C_r)+ABS(A_g,C_g)+ABS(A_b,C_b),$ $ABS(A_r,B_r)+ABS(A_g,B_g)+ABS(A_b,B_b) \leq$ $ABS(D_r,B_r)+ABS(D_g,B_g)+ABS(D_b,B_b),$ $ABS(C_r,D_r)+ABS(C_g,D_g)+ABS(C_b,D_b) \leq$ $ABS(D_r,B_r)+ABS(D_g,B_g)+ABS(D_b,B_b),$ $ABS(C_r,D_r)+ABS(C_g,D_g)+ABS(C_b,D_b) \leq$ $ABS(A_r,C_r)+ABS(A_g,C_g)+ABS(A_b,C_b),$ where THD1 represents a first threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represents red, green, and blue values of the pixel C; $D_r$, $D_g$, and $D_b$ represents red, green, and blue values of the pixel D; and ABS indicates an absolute operation.

6. The method as claimed in claim 4, wherein the 2×2 coding unit is determined to be the second man-made pattern in step (B) when satisfying following equations:

$ABS(A_r,C_r)<THD1, ABS(B_r,D_r)<THD1,$ $ABS(A_g,C_g)<THD1, ABS(B_g,D_g)<THD1,$ $ABS(A_b,C_b)<THD1, ABS(B_b,D_b)<THD1,$ $ABS(A_r,C_r)+ABS(A_g,C_g)+ABS(A_b,C_b) \leq$ $ABS(A_r,B_r)+ABS(A_g,B_g)+ABS(A_b,B_b),$ $ABS(A_r,C_r)+ABS(A_g,C_g)+ABS(A_b,C_b) \leq$ $ABS(D_r,C_r)+ABS(D_g,C_g)+ABS(D_b,C_b),$ $ABS(B_r,D_r)+ABS(B_g,D_g)+ABS(B_b,D_b) \leq$ $ABS(D_r,C_r)+ABS(D_g,C_g)+ABS(D_b,C_b),$ $ABS(B_r,D_r)+ABS(B_g,D_g)+ABS(B_b,D_b) \leq$ $ABS(A_r,B_r)+ABS(A_g,B_g)+ABS(A_b,B_b),$ where THD1 represents a first threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represent red, green, and blue values of the pixel C; $D_r$, $D_g$, and $D_b$ represent red, green, and blue values of the pixel D; and ABS indicates an absolute operation.

7. The method as claimed in claim 4, wherein the 2×2 coding unit is determined to be the third man-made pattern in step (B) when satisfying following equations:

$ABS(A_r,D_r)<THD1, ABS(C_r,B_r)<THD1,$ $ABS(A_g,D_g)<THD1, ABS(C_g,B_g)<THD1,$ $ABS(A_b,D_b)<THD1, ABS(C_b,B_b)<THD1,$ $ABS(A_r,D_r)+ABS(A_g,D_g)+ABS(A_b,D_b) \leq$ $ABS(A_r,B_r)+ABS(A_g,B_g)+ABS(A_b,B_b),$ $ABS(A_r,D_r)+ABS(A_g,D_g)+ABS(A_b,D_b) \leq$ $ABS(D_r,C_r)+ABS(D_g,C_g)+ABS(D_b,C_b),$ $ABS(C_r,B_r)+ABS(C_g,B_g)+ABS(C_b,B_b) \leq$ $ABS(D_r,C_r)+ABS(D_g,C_g)+ABS(D_b,C_b),$ $ABS(C_r,B_r)+ABS(C_g,B_g)+ABS(C_b,B_b) \leq$ $ABS(A_r,B_r)+ABS(A_g,B_g)+ABS(A_b,B_b),$ where THD1 represents a first threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represent red, green, and blue values of the pixel C; $D_r$, $D_g$, and $D_b$ represent red, green, and blue values of the pixel D; and ABS represents an absolute operation.

8. The method as claimed in claim 4, wherein the 2×2 coding unit is determined to be the fourth man-made pattern in step (B) when satisfying following equations:

$ABS(B_r,D_r)<THD2, ABS(C_r,D_r)<THD2,$ $ABS(B_g,D_g)<THD2, ABS(C_g,D_g)<THD2,$ $ABS(B_b,D_b)<THD2, ABS(C_b,D_b)<THD2,$ $ABS(B_r,D_r)+ABS(B_g,D_g)+ABS(B_b,D_b) \leq$ $ABS(A_r,C_r)+ABS(A_g,C_g)+ABS(A_b,C_b),$ $ABS(B_r,D_r)+ABS(B_g,D_g)+ABS(B_b,D_b) \leq$ $ABS(A_r,B_r)+ABS(A_g,B_g)+ABS(A_b,B_b),$ $ABS(C_r,D_r)+ABS(C_g,D_g)+ABS(C_b,D_b) \leq$ $ABS(A_r,B_r)+ABS(A_g,B_g)+ABS(A_b,B_b),$ $ABS(C_r,D_r)+ABS(C_g,D_g)+ABS(C_b,D_b) \leq$ $ABS(A_r,C_r)+ABS(A_g,C_g)+ABS(A_b,C_b),$ where THD2 represents a second threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represent red, green, and blue values of the pixel C; $D_r$, $D_g$, and $D_b$ represent red, green, and blue values of the pixel D; and ABS indicates an absolute operation.

9. The method as claimed in claim 4, wherein the 2×2 coding unit is determined to be the fifth man-made pattern in step (B) when satisfying following equations:

$ABS(B_r,D_r)<THD2, ABS(A_r,B_r)<THD2,$ $ABS(B_g,D_g)<THD2, ABS(A_g,B_g)<THD2,$ $ABS(B_b,D_b)<THD2, ABS(A_b,B_b)<THD2,$ $ABS(B_r,D_r)+ABS(B_g,D_g)+ABS(B_b,D_b) \leq$ $ABS(A_r,C_r)+ABS(A_g,C_g)+ABS(A_b,C_b),$ $ABS(B_r,D_r)+ABS(B_g,D_g)+ABS(B_b,D_b) \leq$ $ABS(C_r,D_r)+ABS(C_g,D_g)+ABS(C_b,D_b),$ $ABS(A_r,B_r)+ABS(A_g,B_g)+ABS(A_b,B_b) \leq$ $ABS(C_r,D_r)+ABS(C_g,D_g)+ABS(C_b,D_b),$ $ABS(A_r,B_r)+ABS(A_g,B_g)+ABS(A_b,B_b) \leq$ $ABS(A_r,C_r)+ABS(A_g,C_g)+ABS(A_b,C_b),$ where THD2 represents a second threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represent red, green, and blue values of the pixel C; $D_r$, $D_g$, and $D_b$ represent red, green, and blue values of the pixel D; and ABS represents an absolute operation.

10. The method as claimed in claim 4, wherein the 2×2 coding unit is determined to be the sixth man-made pattern in step (B) when satisfying following equations:

$ABS(A_r,C_r)<THD2, ABS(A_r,B_r)<THD2,$ $ABS(A_g,C_g)<THD2, ABS(A_g,B_g)<THD2,$ $ABS(A_b,C_b)<THD2, ABS(A_b,B_b)<THD2,$ $ABS(A_r,C_r)+ABS(A_g,C_g)+ABS(A_b,C_b) \leq$ $ABS(B_r,D_r)+ABS(B_g,D_g)+ABS(B_b,D_b),$ $ABS(A_r,C_r)+ABS(A_g,C_g)+ABS(A_b,C_b) \leq$ $ABS(C_r,D_r)+ABS(C_g,D_g)+ABS(C_b,D_b),$ $$\text{ABS}(A_r,B_r)+\text{ABS}(A_g,B_g)+\text{ABS}(A_b,B_b) \le$$

$$\text{ABS}(C_r,D_r)+\text{ABS}(C_g,D_g)+\text{ABS}(C_b,D_b),$$

$$\text{ABS}(A_r,B_r)+\text{ABS}(A_g,B_g)+\text{ABS}(A_b,B_b) \le$$

$$\text{ABS}(B_r,D_r)+\text{ABS}(B_g,D_g)+\text{ABS}(B_b,D_b),$$

where THD2 represents a second threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represent red, green, and blue values of the pixel C; $D_r$, $D_g$, and $D_b$ represent red, green, and blue values of the pixel D; and ABS represents an absolute operation.

11. The method as claimed in claim 4, wherein the 2×2 coding unit is determined to be the seventh man-made pattern in step (B) when satisfying following equations:

$$\text{ABS}(A_r,C_r)<\text{THD2}, \text{ABS}(C_r,D_r)<\text{THD2},$$

$$\text{ABS}(A_g,C_g)<\text{THD2}, \text{ABS}(C_g,D_g)<\text{THD2},$$

$$\text{ABS}(A_b,C_b)<\text{THD2}, \text{ABS}(C_b,D_b)<\text{THD2},$$

$$\text{ABS}(A_r,C_r)+\text{ABS}(A_g,C_g)+\text{ABS}(A_b,C_b) \le$$

$$\text{ABS}(B_r,D_r)+\text{ABS}(B_g,D_g)+\text{ABS}(B_b,D_b),$$

$$\text{ABS}(A_r,C_r)+\text{ABS}(A_g,C_g)+\text{ABS}(A_b,C_b) \le$$

$$\text{ABS}(A_r,B_r)+\text{ABS}(A_g,B_g)+\text{ABS}(A_b,B_b),$$

$$\text{ABS}(C_r,D_r)+\text{ABS}(C_g,D_g)+\text{ABS}(C_b,D_b) \le$$

$$\text{ABS}(A_r,B_r)+\text{ABS}(A_g,B_g)+\text{ABS}(A_b,B_b),$$

$$\text{ABS}(C_r,D_r)+\text{ABS}(C_g,D_g)+\text{ABS}(C_b,D_b) \le$$

$$\text{ABS}(B_r,D_r)+\text{ABS}(B_g,D_g)+\text{ABS}(B_b,D_b),$$

where THD2 represents a second threshold; A represents the upper left pixel; B represents the upper right pixel; C represents the lower left pixel; D represents the lower right pixel; $A_r$, $A_g$, and $A_b$ represent red, green, and blue values of the pixel A; $B_r$, $B_g$, and $B_b$ represent red, green, and blue values of the pixel B; $C_r$, $C_g$, and $C_b$ represent red, green, and blue values of the pixel C; $D_r$, $D_g$, and $D_b$ represent red, green, and blue values of the pixel D; and ABS represents an absolute operation.

12. The method as claimed in claim 4, wherein, when the 2×2 coding unit in step (C) is the first, the second, or the third man-made pattern, an average of two pixels of the 2×2 coding unit is recorded by eight bits, a location of a 7-bit table is recorded by seven bits, and the location of the 7-bit table is the one, in all recorded content of the 7-bit table, that is closest to a result of subtracting the average of the two pixels from an average of the other two pixels of the 2×2 coding unit.

13. The method as claimed in claim 12, wherein, when the 2×2 coding unit in step (C) is the fourth, the fifth, the sixth, and the seventh man-made pattern, an average of three pixels of the 2×2 coding unit is recorded by eight bits, and a quantized value of the last pixel of the 2×2 coding unit is recorded by seven or six bits.

14. The method as claimed in claim 4, wherein an RGB to YUV color domain transform in step (D) is performed for generating the 2×2 color domain transform unit, and the RGB to YUV color domain transform is expressed as:

$$\begin{bmatrix} Y \\ U \\ V \end{bmatrix} = \begin{bmatrix} 0.25 & 0.5 & 0.25 \\ -0.5 & 1.0 & -0.5 \\ -1.0 & 0 & 1.0 \end{bmatrix} \begin{bmatrix} r \\ g \\ b \end{bmatrix},$$

where r represents a red value of a pixel; g represents a green value of the pixel, b represents a blue value of the pixel; Y represents a luminance of the pixel; U and V represent a chrominance of the pixel; and the 2×2 color domain transform unit contains a 2×2 luminance transform unit, a first 2×2 chrominance transform unit, and a second 2×2 chrominance transform unit.

15. The method as claimed in claim 14, wherein the discrete cosine transform in step (D) is expressed as:

$$\begin{bmatrix} E \\ F \\ G \\ H \end{bmatrix} = 0.25 \times \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} \overline{A} \\ \overline{B} \\ \overline{C} \\ \overline{D} \end{bmatrix},$$

where $\overline{A}$ represents a value on an upper left corner of the 2×2 color domain transform unit; $\overline{B}$ represents a value on an upper right corner of the 2×2 color domain transform unit; $\overline{C}$ represents a value on a lower left corner of the 2×2 color domain transform unit; $\overline{D}$ represents a value on a lower right corner of the 2×2 color domain transform unit; E represents a value on an upper left corner of the 2×2 frequency domain unit; F represents a value on an upper right corner of the 2×2 frequency domain unit; G represents a value on a lower left corner of the 2×2 frequency domain unit; H represents a value on a lower right corner of the 2×2 frequency domain unit; the 2×2 frequency domain unit contains a 2×2 frequency domain luminance unit, a first 2×2 frequency domain chrominance unit, and a second 2×2 frequency domain chrominance unit.

16. The method as claimed in claim 15, further comprising, between steps (E) and (F), the step of:

(H) grouping the 2×2 frequency domain unit into a first natural pattern and a second natural pattern, wherein when the first 2×2 frequency domain chrominance unit has elements F and G satisfying following equation:

$$\max(\text{ABS}(F,0), \text{ABS}(G,0)) < \text{THD3},$$

and the second 2×2 frequency domain chrominance unit has elements F and G satisfying following equation:

$$\max(\text{ABS}(F,0), \text{ABS}(G,0)) < \text{THD4},$$

the 2×2 frequency domain unit 750 is determined to be the first natural pattern and, otherwise, to be the second natural pattern, where THD3 represents a third threshold, and THD4 represents a fourth threshold.

17. The method as claimed in claim 16, wherein, when the 2×2 frequency domain unit in step (F) is the first natural pattern, elements E, F, G of the 2×2 frequency domain luminance unit is recorded by seven bits, a location of a 4-bit table is recorded by four bits, a recorded content of the location of the 4-bit table shows the one, in all recorded content of the 4-bit table, that is closest to a value of element H of the 2×2 frequency domain luminance unit.

18. The method as claimed in claim 16, wherein, when the 2×2 frequency domain unit in step (F) is the first natural pattern, an element E of the first 2×2 frequency domain chrominance unit is recorded by seven bits, a location of a 2-bit table is recorded by two bits, a recorded content of the location of the 2-bit table shows the one, in all recorded content of the 2-bit table, that is closest to an average of the elements F and G of the first 2×2 frequency domain chrominance unit, and an element H of the first 2×2 frequency domain chrominance unit is not recorded.

19. The method as claimed in claim 16, wherein when the 2×2 frequency domain unit in step (F) is the first natural pattern, an element E of the second 2×2 frequency domain chrominance unit is recorded by seven bits, a location of a 2-bit table is recorded by two bits, a recorded content of the location of the 2-bit table shows the one, in all recorded content of the 2-bit table, that is closest to an average of the elements F and G of the second 2×2 frequency domain chrominance unit, a location of a 3-bit table is recorded by three bits, and a recorded content of the location of the 3-bit table shows the one, in all recorded content of the 3-bit table, that is closest to a value of element H of the second 2×2 frequency domain chrominance unit.

20. The method as claimed in claim 16, wherein when the 2×2 frequency domain unit in step (F) is the second natural pattern, a quantized value of element E of the 2×2 frequency domain luminance unit is recorded by six bits, a quantized value of element F of the 2×2 frequency domain luminance unit is recorded by five bits, a quantized value of element G of the 2×2 frequency domain luminance unit is recorded by five bits, a location of a 3-bit table is recorded by three bits, and a recorded content of the location of the 3-bit table shows the one, in all recorded content of the 3-bit table, that is closest to a value of element H of the 2×2 frequency domain luminance unit.

21. The method as claimed in claim 16, wherein when the 2×2 frequency domain unit in step (F) is the second natural pattern, a quantized value of element E of the first 2×2 frequency domain chrominance unit is recorded by five bits, a location of a 3-bit table is recorded by three bits such that a recorded content of the location of the 3-bit table shows the one, in all recorded content of the 3-bit table, that is closest to a value of the element F of the first 2×2 frequency domain chrominance unit, a location of a 3-bit table is recorded by three bits such that a recorded content of the location of the 3-bit table shows the one, in all the recorded content of the 3-bit table, that is closest to a value of the element G of the first 2×2 frequency domain chrominance unit, and an element H of the first 2×2 frequency domain chrominance unit is not recorded.

22. The method as claimed in claim 16, wherein when the 2×2 frequency domain unit in step (F) is the second natural pattern, a quantized value of element E of the second 2×2 frequency domain chrominance unit is recorded by five bits, a location of a 4-bit table is recorded by four bits such that a recorded content of the location of the 4-bit table shows the one, in all recorded content of the 4-bit table, that is closest to a value of the element F of the second 2×2 frequency domain chrominance unit, a location of a 4-bit table is recorded by four bits such that a recorded content of the location of the 4-bit table shows the one, in all the recorded content of the 4-bit table, that is closest to a value of the element G of the second 2×2 frequency domain chrominance unit, a location of a 3-bit table is recorded by three bits, and the recorded content of the location of the 3-bit table shows the one, in all the recorded content of the 3-bit table, that is closest to a value of element H of the second 2×2 frequency domain chrominance unit.

23. The method as claimed in claim 4, wherein the 2×2 coding unit has a bit number of 96 bits, and the coded packet has a bit number of 48 bits.

24. The method as claimed in claim 4, wherein the method is performed on a display system of fixed bit-rate image compression/decompression, the display system including:
    a display module for displaying the image;
    an image input device for inputting the image;
    a fixed-bit-rate image compression device connected to the image input device for encoding the 2×2 coding unit of the image to generate the coded packet corresponding to the 2×2 coding unit;
    a buffer connected to the fixed-bit-rate image compression device for temporarily storing the coded packet outputted by the fixed-bit-rate image compression device;
    a fixed-bit-rate image decompression device connected to the buffer for receiving and decompressing the coded packet to generate the 2×2 decoding unit corresponding to the 2×2 coding unit; and
    a timing controller connected to the fixed-bit-rate image decompression device for receiving the 2×2 decoding unit to generate the clock driving signal and display data of the display module,
    wherein the fixed-bit-rate image compression device first determines whether the 2×2 coding unit is a man-made or natural pattern, next performs a differential error encoding and a quantization and look-up on the 2×2 coding unit for generating the first coded data when the 2×2 coding unit is a man-made pattern, then sequentially performs a color domain transform, a discrete cosine transform, and a quantization and look-up on the 2×2 coding unit for generating a second coded data when the 2×2 coding unit is a natural pattern, and finally packages the first or second coded data for generating the coded packet with a fixed bit rate.

25. A method of fixed bit-rate image decompression based on 2×2 image unit, which decodes a coded packet for generating a plurality of 2×2 decoding units from an image, each 2×2 decoding unit containing four pixels in a matrix arrangement, the method comprising the steps of:
    (A) receiving a coded packet;
    (B) using a first header of the coded packet to determine whether the coded packet is a man-made pattern and, if yes, the coded packet being determined to be a man-made pattern, otherwise to be a natural pattern;
    (C) performing an inverse quantization and inverse lookup and an inverse differential error decoding on the coded packet of the man-made pattern for generating a first decoded data;
    (D) performing an inverse quantization and lookup on the coded packet of natural pattern for generating a second decoded data;
    (E) performing a inverse discrete cosine transform on the second decoded data for generating a third decoded data;
    (F) performing a color domain transform on the third decoded data for generating a fourth decoded data; and
    (G) receiving and reconstructing the first or fourth decoded data for generating the 2×2 decoding unit.

26. The method as claimed in claim 25, wherein step (B) further comprises the steps of:

(H) using a second header of the coded packet to determine whether the coded packet is one of first to third man-made patterns when the coded packet of man-made pattern is determined in step (B), wherein the first man-made pattern indicates that four pixels present two strips in a horizontal direction, the second man-made pattern indicates that the four pixels present two strips in a vertical direction, and the third man-made pattern indicates that the four pixels present two strips crossed at 45 degree direction; and (I) using the second header and a third header of the coded packet to determine whether the coded packet is one of fourth to seventh man-made patterns when the coded packet is not any one of first to third man-made patterns, wherein the fourth to seventh man-made patterns indicate that the four pixels present a combination of triangle and single point.

27. The method as claimed in claim 26, further comprising, between steps (C) and (D), the step of:

(J) using a fourth header of the coded packet to determine whether the coded packet is first or second natural pattern when the coded packet of natural pattern is determined in step (B).

28. The method as claimed in claim 27, wherein the inverse discrete cosine transform in step (E) has transform matrix coefficients expressed as:

$$\begin{bmatrix} \overline{A} \\ \overline{B} \\ \overline{C} \\ \overline{D} \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} E \\ F \\ G \\ H \end{bmatrix},$$

where E, F, G, and H represent the second decoded data; and $\overline{A}$, $\overline{B}$, $\overline{C}$, and $\overline{D}$ represent the third decoded data.

29. The method as claimed in claim 28, wherein a YUV to RGB color domain transform is performed in step (F), and the YUV to RGB color domain transform has transform matrix coefficients expressed as:

$$\begin{bmatrix} r \\ g \\ b \end{bmatrix} = \begin{bmatrix} 1.0 & -0.5 & -0.5 \\ 1.0 & 0.5 & 0 \\ 1.0 & -0.5 & 0.5 \end{bmatrix} \begin{bmatrix} Y \\ U \\ V \end{bmatrix},$$

where Y represent a luminance of a pixel of the third decoded data; U and V represent a chrominance of the pixel of the third decoded data; r represents a red value of a pixel of the fourth decoded data; g represents a green value of the pixel of the fourth decoded data; b represents a blue value of the pixel of the fourth decoded data.

* * * * *